United States Patent [19]

Nothaft et al.

[11] Patent Number: 5,042,868
[45] Date of Patent: Aug. 27, 1991

[54] DRIVING MECHANISM FOR A MOTOR-DRIVEN CONVERTIBLE ROOF

[75] Inventors: Josef Nothaft, Schaufling; Raimund Völkl, Deggendorf, both of Fed. Rep. of Germany

[73] Assignee: ED. Scharwächter GmbH & Co. KG, Remscheid, Fed. Rep. of Germany

[21] Appl. No.: 517,822

[22] Filed: May 2, 1990

[30] Foreign Application Priority Data

May 3, 1989 [DE] Fed. Rep. of Germany ... 8905574[U]

[51] Int. Cl.⁵ ............................................. B60J 7/12
[52] U.S. Cl. .................................. 296/107; 296/117; 74/480 R
[58] Field of Search ............... 296/107, 117; 74/480 R

[56] References Cited

U.S. PATENT DOCUMENTS 2,459,089  1/1949  Orr ........................................ 296/117

FOREIGN PATENT DOCUMENTS

| 618384 | 3/1927 | France | 296/107 |
| 318283 | 6/1934 | Italy | 296/107 |
| 0249815 | 11/1986 | Japan | 296/107 |
| 192466 | 11/1937 | Switzerland | 296/107 |

*Primary Examiner*—Dennis H. Pedder
*Attorney, Agent, or Firm*—Toren, McGeady & Associates

[57] ABSTRACT

A driving mechanism for a motor-driven convertible roof for a motor vehicle has a linkage system formed of a front roof frame, a rear roof frame, and a main roof arch pivotally connected to the motor vehicle body by a tension bracket and another bracket. A motor drive and a transmission system are connected to the main roof arch and the tension bracket and provide the driving force for the linkage system. The main roof arch and the tension bracket are each driven by a separate lever and connecting rod. One of the levers entrains the other over a certain range of movement and the motor drive includes a drive motor and shaft for driving the levers about separate spaced axes for effecting the drive of the linkage system.

9 Claims, 2 Drawing Sheets

DRIVING MECHANISM FOR A MOTOR-DRIVEN CONVERTIBLE ROOF

BACKGROUND OF THE INVENTION

The present invention is directed to a driving mechanism for a motor-driven convertible roof or top for a motor vehicle. The roof includes a linkage formed of a front roof frame, a rear roof frame, and a main roof arch pivotally connected by a bracket to the motor vehicle body. A connecting rod extends between the main roof arch and a tension bracket. A motor drive along with a transmission system provides the driving force to the main roof arch and the tension bracket.

It is known in motor-driven convertible tops for motor vehicles of the above type, that the main roof arch can be driven directly by a drive motor with the drive for the tension bracket diverted by a linkage or a cam control system from the drive for the main roof arch so that the tension bracket is lowered toward the body when the main roof arch and the roof frame have approximately reached the closed position. When the roof is moved into the open position, the tension bracket is raised before the main roof arch commences its movement and, as a result, the roof frame is also in the collapsed or open condition. With known drives, an expensive arrangement of gears and cam guides is required which are susceptible to problems due to the required sequence of movements of the main roof arch and the tension bracket. Such cam and gear arrangement must also be accommodated in the region of the connection of the main roof arch to the motor vehicle body. Drive arrangements for the main roof arch and the tension bracket can be driven by independent driving mechanisms designed more favorably with regard to their accommodation in the motor vehicle body, however, they require separate drive motors and because of the required sequence of movement of the main roof arch and the tension bracket, an expensive control system for the drive motors is needed.

SUMMARY OF THE INVENTION

Therefore, the primary object of the present invention is to provide a driving mechanism for a motor-driven convertible top for a motor vehicle that requires only a single simple drive motor and can be accommodated at a suitable location within the motor vehicle body and can be implemented at the lowest possible production and assembly costs.

In accordance with the present invention, both the main roof arch and the tension bracket are each in driving connection, using gears, by way of separate connecting rods and levers, so that one lever is mounted on a stationary axle and is powered from a shaft driven by the drive motor. Accordingly, each of the two levers are pivoted about axes in spaced parallel relation and include a path-dependent drive coupling. Use of a separate connecting rod and pivotal lever for driving the main roof arch, as well as for the tension bracket, makes it possible to connect only that one of the two levers assigned to the part with the largest required adjustment path, for instance, the main roof arch, to the motor drive in a rotatably secure connection and to drive the lever assigned to the other part, for instance, the tension bracket, by means of a towing device only for a certain angle required for the movement of the tension bracket by the lever employed for the adjustment of the main roof arch. Accordingly, the use of a simple towing mechanism prevents the need for complicated gear systems. Moreover, the use of separate connecting rods to connect the parts to be driven, that is, the main roof arch and the tension bracket to the drive motor, makes it possible to provide such arrangement in a better location within the motor vehicle body.

In a preferred embodiment of the invention, the lever which drives the main roof arch is coupled to the shaft driven by the motor so that the lever rotates with the shaft. On the other hand, the lever used to drive the tension bracket is formed as a pulling lever with two arms and is provided with an entraining or towing device which operates in both directions of movement of its lever arm pivotally mounted on a stationary axle.

The offset arrangement of the bearing axes for the two levers is designed to be larger in a horizontal direction than the effective length in one direction of movement of the entraining device on the lever arm of the lever which drives the tension bracket.

In such a design of the entraining device, it is necessary that the two lever arms of the lever for driving the tension bracket are arranged at right angles to one another and the entraining device is arranged asymmetrically on the free lever arm of the lever depending on the axial displacement of the bearing axes of the two levers so that it is effective in the direction of movement for raising the tension bracket only over a certain adjustment distance of the lever.

The entrainment or pulling device formed on the free lever arm of the lever driving the tension bracket is preferably formed by an essentially U-shaped cross-section of the lever arm. This feature can be achieved in an especially advantageous manner by simply manufacturing the two levers from pressed sections of steel plate.

In another feature of the invention, it is possible to provide the two levers in separate planes, one located above the other and with the towing lever affording the drive of the tension bracket arranged so that it reaches under the lever for the main roof arch and, in addition, the effective lever arms of the two levers have different lengths, whereby the lever arm for driving the tension bracket has a greater length than the lever arm driving the main roof arch.

Preferably, the driving mechanism is arranged so that the lever driving the main roof arch is driven by an electric motor so that it rotates about its bearing axis by means of an angle gear.

In a modified embodiment, however, it is also possible that in the driving mechanism, the lever used for driving the main roof arch can also be driven by a coaxially positioned toothed wheel rim and a toothed rack driven by a linear drive motor.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
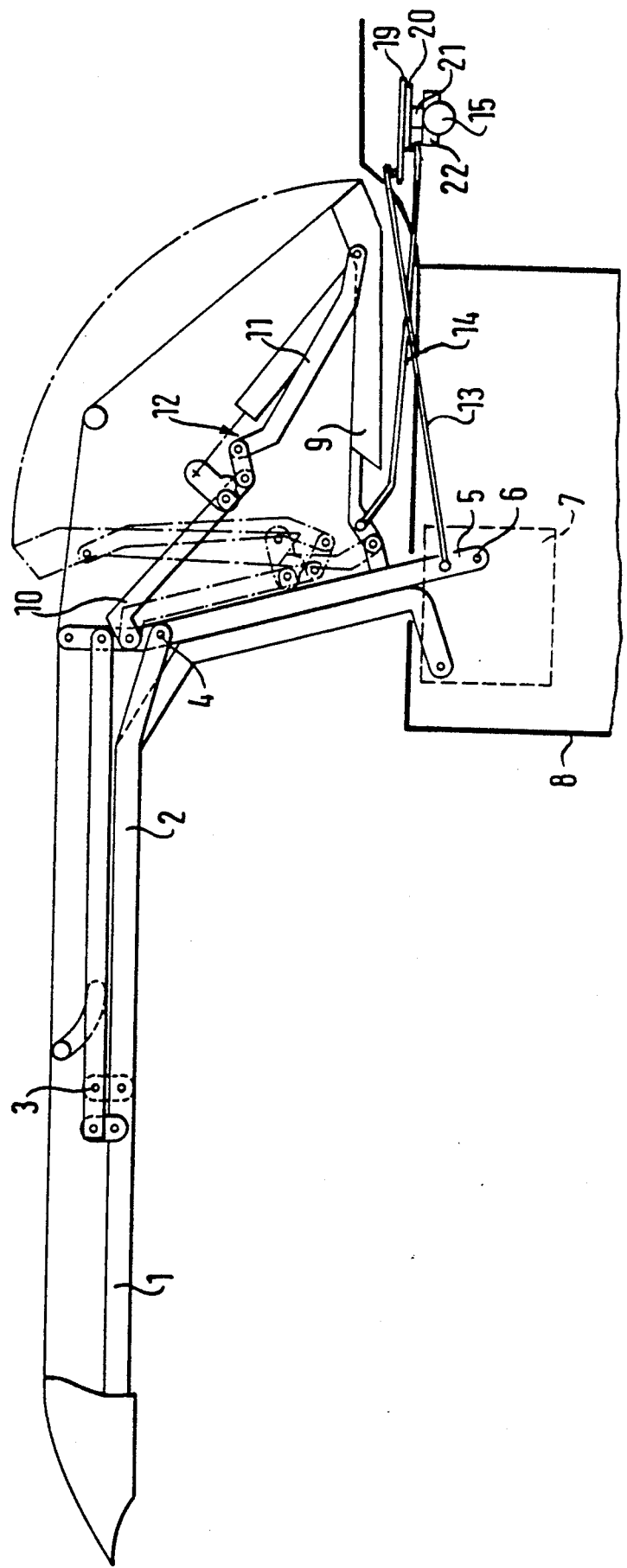
FIG. 1 is a generally schematic view of a motor-driven convertible roof for a motor vehicle.

As shown schematically in FIG. 1, a motor-driven convertible roof for a motor vehicle includes a front roof frame 1 and a rear roof frame 2 interconnected for pivotal movement about an axis 3 extending transversely of the direction of travel of the vehicle. At its opposite end from the axis 3, the rear roof frame 2 is connected to a main roof arch 5, so that it can pivot about an axis 4, also extending transversely of the direction of travel. The main roof arch 5 is, in turn, pivotally connected to bracket 7 attached to the motor vehicle body 8 so that the arch can pivot about an axis 6 extending transversely of the direction of travel. A tension bracket 9 is connected to the main roof arch 5 so that it can pivot parallel to the hinge axis 6 of the main roof arch 5. When the convertible roof is closed, the main roof arch 5 is supported against tension bracket 9 by a connecting or retaining rod 12 formed of two parts 10, which can be pivoted toward one another. With the convertible top or roof, as illustrated in the drawing, the main roof arch 5 is in driving connection via a connecting rod 13 with a drive motor 15 located in the region of the trunk of the motor vehicle body 8 with the tension bracket 9 connected to the same drive motor by another connecting rod 14.

Figure 2:
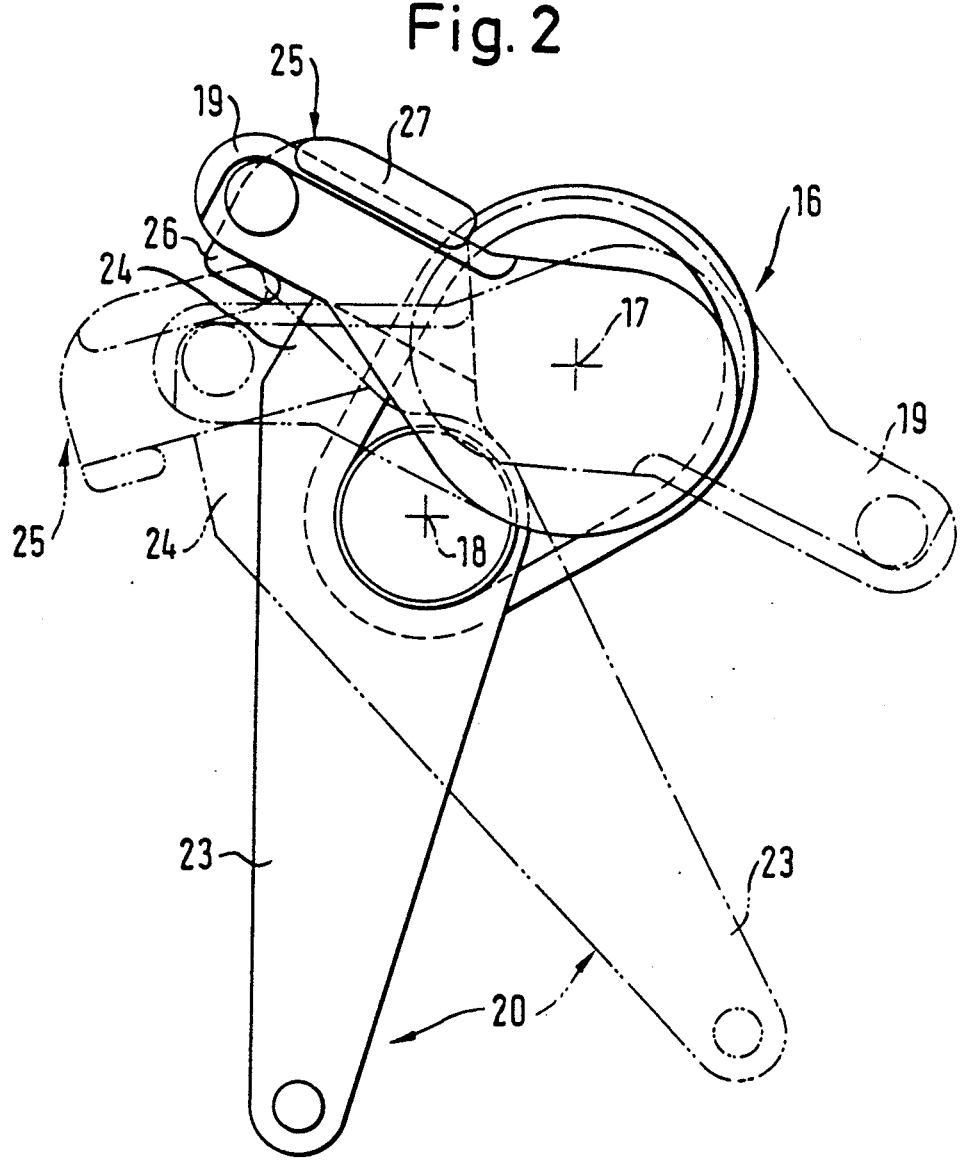
FIG. 2 is a top view of a driving mechanism for the convertible roof in FIG. 1, illustrated in various adjustment positions corresponding to different roof positions.

For purposes of further description, the connecting rod 13 is characterized as the first connecting rod and connecting rod 14 as the second connecting rod. For proper control sequence in driving the main roof arch 5 and the tension bracket 9, a driving mechanism 16, note FIG. 2, is located between the drive motor 15 and the main roof arch 5 and tension bracket 9. Driving mechanism 16 includes a first lever 19 and a second lever 20 mounted for rotation about axes 17, 18, respectively. Note that the axes 17 and 18 are in spaced parallel relationship. The first lever 19 is connected to the first connecting rod 13 for driving the main roof arch 5 and the second lever 20 is connected to the second connecting rod 14 for driving the tension bracket 9. First lever 19, joined by the connecting rod 13 for driving the main roof arch 5, is secured on a driven shaft 21 which also forms the bearing axis 17 for the lever and is in driving connection with the drive motor 15 by an angle gear 22. Second lever 20 is connected to the tension bracket 9 by second connecting rod 14 for driving the tension bracket and the second lever is mounted for free rotation on the stationary bearing axis 18 positioned offset relative to axis 17. Second lever 20 is a double-armed lever connected by one lever arm 23 to connecting rod 14 with its other free lever arm 24 forming an entraining or towing mechanism 25.

Figure 3:
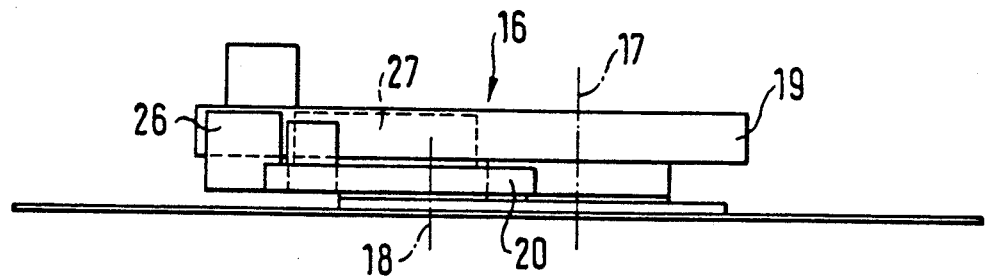
FIG. 3 is a side view of FIG. 2.

Accordingly, the first lever 19 which drives the main roof arch 5 engages in the entraining or towing mechanism 25 over a certain range of its pivot angle. Entraining or towing mechanism 25 comprises a U-shaped cross-sectional part of the free lever arm 24 and is asymmetrical, whereby part 26 of the entraining and towing mechanism 25, forming part of the entraining mechanism for raising the tension bracket 9, is engaged by the first lever 19 which drives the main roof arch 5, while the other part 27 of the entraining and towing mechanism has a length assuring that second lever 20 will be entrained until the main roof arch 5 has completely collapsed. As shown, particularly in FIG. 2, the lever arms 23, 24 of the double-armed second lever 20 are at right angles to one another. The first and second levers 19, 20 are located in two spaced planes, one above the other, note FIG. 3, and are positioned so that the second lever 20, which drives the tension bracket 9, reaches under the first lever 19, driving the main roof arch 5, and reaches around it in the region of the entraining or towing mechanism 25.

While specific embodiments of the invention have been shown and described in detail to illustrate the application of the inventive principles, it will be understood that the invention may be embodied otherwise without departing from such principles.

What is claimed is:

1. Driving mechanism for a motor-driven convertible top for a motor vehicle including a motor vehicle body, comprising a linkage system including a front roof frame, a rear roof frame, and a main roof arch connected to the motor vehicle body, a retaining rod supporting said main roof arch against a tension bracket, wherein the improvement comprises a drive motor (15) with a shaft (21), means for forming a drive connection between said shaft (21) and each of said main roof arch (5) and said tension bracket (9), said means comprising a first connecting rod (13) and a first lever (19) connected to said main roof arch and a second connecting rod (14) and a second lever (20) connected to said tension bracket, said first lever (19) mounted for pivotal movement about a first axis (17), and said second lever pivotally mounted on a second axis (18), said first and second axes disposed in parallel and laterally spaced relation, and means (25) on one of said first and second levers (19, 20) arranged to be entrained by the other one of said first and second levers (19, 20) as said drive motor pivots the other one of said first and second levers over a pivot angle whereby the engagement of said means by the other one of said first and second levers takes place only over a certain range of the pivot angle and disengage outside that range.

2. Driving mechanism, as set forth in claim 1, wherein said first lever (19) for driving said main roof arch (5) is secured to said shaft (21) for rotation therewith, and said second lever (20) cooperating with said tension bracket (9) comprises said entraining means for entrainment by said first lever (19).

3. Driving mechanism, as set forth in claim 2, wherein said second lever (20) has two arms (23, 24) and one of said arms is a free lever arm (24) and includes said entraining means in the form of an entraining device (25) for entrainment with said first lever (19).

4. Driving mechanism, as set forth in claim 3, wherein the spacing between said first and second axes (17, 18) of said first and second levers (19, 20) is greater than a length of said entraining device (25) of said second lever (20).

5. Driving mechanism, as set forth in claim 4, wherein said first and second lever arms (23, 24) of said second lever (20) are disposed at right angles to one another, and the entraining device (25) on the second lever arm (24) is arranged in accordance with the spaced relation of said axes (17, 18) of said first and second levers (19, 20) so that the entraining device is entrained over only a certain angle adjusting path of said second lever (20) in the direction of movement for raising the tension bracket (9).

6. Driving mechanism, as set forth in claim 5, wherein said entraining device (25) on the second lever arm (24)

of the lever (20) is formed of a U-shaped section of said second lever arm (24).

7. Driving mechanism, as set forth in claim 6, wherein said first and second levers are arranged in spaced horizontal planes, and the second lever (20) is positioned to reach under said first lever (19).

8. Driving mechanism, as set forth in claim 1, wherein each of said first and second levers (19) has an effective lever arm (19, 23), each of a different length with the effective lever arm (23) of said second lever arm (20) being longer than the effective lever arm (19) of said first lever arm (19).

9. Driving mechanism, as set forth in claim 1, wherein said first lever (19) driving said main roof arch (5) is driven by an electric motor (15) and is rotated about a bearing axis (17) by an angle gear (22).

* * * * *